US009460634B2

(12) United States Patent
Rosen et al.

(10) Patent No.: US 9,460,634 B2
(45) Date of Patent: Oct. 4, 2016

(54) SYSTEMS FOR AND METHODS OF DIGITAL RECORDING AND REPRODUCTION OF TACTILE DRAWINGS

(71) Applicant: University of Vermont and State Agricultural College, Burlington, VT (US)

(72) Inventors: Michael Rosen, Burlington, VT (US); Michael Coleman, South Burlington, VT (US); Joshua Coffee, South Burlington, VT (US); William David Banks, Saratoga Springs, NY (US); Kristin Leigh Funabashi, Brookline, MA (US); Rebecca Risko, Ferndale, MI (US); Akie Hashimoto, Durham, NC (US); Keegan Jennings Brown, Roxbury, MA (US); Katherine Accomando, Beverly, MA (US)

(73) Assignee: University of Vermont and State Agricultural College, Burlington, VT (US)

( * ) Notice: Subject to any disclaimer, the term of this patent is extended or adjusted under 35 U.S.C. 154(b) by 549 days.

(21) Appl. No.: 13/684,993

(22) Filed: Nov. 26, 2012

(65) Prior Publication Data

US 2013/0082830 A1    Apr. 4, 2013

Related U.S. Application Data

(63) Continuation of application No. 13/457,704, filed on Apr. 27, 2012, now abandoned.

(60) Provisional application No. 61/481,666, filed on May 2, 2011.

(51) Int. Cl.
G09B 21/00    (2006.01)
G09B 21/02    (2006.01)
(Continued)

(52) U.S. Cl.
CPC ............ *G09B 21/003* (2013.01); *G06F 3/016* (2013.01); *G06F 3/03547* (2013.01); *G09B 21/002* (2013.01); *G09B 21/02* (2013.01)

(58) Field of Classification Search
CPC .. G06F 3/0488; G09B 21/003; B43L 13/024
USPC .............................. 33/18.1; 434/114; 345/173
See application file for complete search history.

(56) References Cited

U.S. PATENT DOCUMENTS

| 2,616,198 | A | 11/1952 | Sewell |
|---|---|---|---|
| 3,667,139 | A | 6/1972 | Barr |

(Continued)

FOREIGN PATENT DOCUMENTS

FR    2855886 A1 * 12/2004    ............. G06F 3/041

OTHER PUBLICATIONS http://americanthermoform.com/category/products/thermoform-machines/ (Last viewed Apr. 29, 2015).

(Continued)

*Primary Examiner* — Yaritza Guadalupe-McCall
(74) *Attorney, Agent, or Firm* — Downs Rachlin Martin PLLC

(57) ABSTRACT

Systems and methods of digitally recording and reproducing tactile drawings are disclosed. The method includes moving a stylus over a path on the first tactile drawing medium to form a tactile feature thereon, and digitally recording the path of the moving stylus to generate digital path data. The method also include reproducing the tactile feature on a second tactile drawing medium operably disposed in a tactile printer based on the digital path data. The systems and methods include forming tactile drawings based on a digital graphics file, including filtering the digital graphics file to form a .RLD file suitable for forming a tactile drawing having features capable of being tactilely sensed.

10 Claims, 19 Drawing Sheets

(51) Int. Cl.
*G06F 3/01* (2006.01)
*G06F 3/0354* (2013.01)

(56) References Cited

U.S. PATENT DOCUMENTS

| | | | | |
|---|---|---|---|---|
| 3,768,180 A * | 10/1973 | Arrdal | G09B 21/003 | 434/114 |
| 3,855,707 A * | 12/1974 | Traylor | B43L 13/00 | 33/24.3 |
| 4,713,887 A * | 12/1987 | Kitamura | B23Q 1/621 | 33/1 M |
| 5,502,967 A | 4/1996 | Nakagawa et al. | | |
| 5,529,501 A | 6/1996 | Maruyama | | |
| 5,543,589 A * | 8/1996 | Buchana | H03K 17/9618 | 178/18.03 |
| 5,574,830 A * | 11/1996 | Quzilleau | B41J 3/32 | 358/1.3 |
| 5,636,038 A * | 6/1997 | Lynt et al. | | 358/471 |
| 5,818,721 A * | 10/1998 | Funahashi | B44B 3/009 | 700/182 |
| 8,228,299 B1 * | 7/2012 | Maloney | G06Q 20/14 | 345/173 |
| 2002/0047833 A1 * | 4/2002 | Kitada | G06F 3/0433 | 345/173 |
| 2003/0016282 A1 | 1/2003 | Koizumi | | |
| 2005/0233287 A1 * | 10/2005 | Bulatov | G09B 21/006 | 434/114 |
| 2006/0024647 A1 * | 2/2006 | Chesnais | G09B 21/005 | 434/114 |
| 2006/0231109 A1 | 10/2006 | Howell et al. | | |
| 2010/0182245 A1 * | 7/2010 | Edwards et al. | | 345/173 |
| 2010/0238620 A1 | 9/2010 | Fish | | |
| 2010/0283745 A1 * | 11/2010 | Nikolovski | G06F 3/0436 | 345/173 |
| 2011/0298709 A1 * | 12/2011 | Vaganov | G06F 3/03546 | 345/158 |
| 2012/0206742 A1 * | 8/2012 | Palomo | G09B 21/003 | 358/1.9 |
| 2012/0235935 A1 | 9/2012 | Ciesla et al. | | |
| 2013/0107144 A1 | 5/2013 | Marhefka et al. | | |
| 2013/0229386 A1 | 9/2013 | Bathiche et al. | | |

OTHER PUBLICATIONS https://www.youtube.com/watch?v=foyc4KzmG9g (ATC Brailon Duplicator: A Brief Tutorial) (Last viewed Apr. 29, 2015).
http://store.humanware.com/hus/piaf-picture-in-a-flash-tactile-graphic-maker.html (Last viewed Apr. 29, 2015).
https://www.youtube.com/watch?v=Xa7cKxSk584 (PAIF Making Tactile Graphics) (Last viewed Apr. 29, 2015).
Final Office Action dated Dec. 23, 2015, in related U.S. Appl. No. 13/685,002, to Michael Rosen, filed Nov. 26, 2012.

* cited by examiner

SYSTEMS FOR AND METHODS OF DIGITAL RECORDING AND REPRODUCTION OF TACTILE DRAWINGS

RELATED APPLICATION DATA

This application is a continuation of U.S. application Ser. No. 13/457,704, filed Apr. 27, 2012, and titled "Systems For and Methods of Digital Recording and Reproduction of Tactile Drawings," which application claims the benefit of priority of U.S. Provisional Application Ser. No. 61/481,666, filed on May 2, 2011. Each of these applications is incorporated by reference herein in its entirety.

This application is also related to U.S. patent application Ser. No. 13/685,002, entitled "Thermal Eraser For Tactile Drawings," which is being filed concurrently with the present application, and U.S. patent application Ser. No. 13/457,725, filed on Apr. 27, 2012, and titled "Thermal Eraser For Tactile Drawings."

All references, publications, patent documents, etc. mentioned herein are incorporated herein by reference.

FIELD OF THE INVENTION

The present disclosure relates to tactile drawings and in particular to system and methods directed to digitizing such drawings and reproducing such drawings on a suitable medium.

BACKGROUND OF THE INVENTION

Tactile graphics are used primarily by the blind and sight-impaired because they allow for tactile sensing. In general, tactile graphics refer to any graphics being communicated via media that allow for tactile sensing. Tactile drawings, also called raised line drawings or RLD's, are tactile graphics created by freehand drawing or sketching on specialized media.

With reference to FIG. 1, tactile drawings are formed in one example by a stylus 10 that is pressed into and moved relative to the surface 21 of a locally deformable medium 20, also referred to herein as a "tactile drawing medium." The tactile drawing medium 20 permanently or semi-permanently supports one or more tactile features 30 when pressure is applied by the stylus. In particular, as stylus 10 is moved across and is pressed into surface 21 of deformable medium 20 by a user (not shown), a tactile feature 30 is formed thereon, with the tactile feature being representative of the stylus path.

A typical tactile drawing medium 20 comprises a thin plastic sheet, which is placed and secured (e.g., via a clip 40, as shown) on top of a pad of flexible or indentable material 24, such as rubber. Stylus 10 can be a typical ballpoint pen or the like. The force of stylus 10 on the flexible material 24 through tactile drawing medium 20 locally indents and stretches the tactile drawing medium, which responds by rising into positive relief to create a tactile feature 30. This system has the benefit of letting a user feel what they are drawing while they draw it, and provides a permanent hardcopy of their tactile drawing that others can tactilely sense.

To date there is no practical means for readily reproducing tactile drawings or forming non-tactile copies from tactile drawings. There exists methods for creating or even reproducing some forms of tactile graphics; i.e. printers that print tactile graphics, e.g. Braille graphics printers and thermoform "toasters". A major difference is that the media on which these devices print is not interactive, meaning that a human user cannot add to or edit the graphics. Such tactile graphics cannot be created and sensed tactilely at the same time, and thus are generally not employed by blind users who wish to communicate graphically. In contrast, tactile drawings allow a user to create and tactilely sense graphics in real-time.

SUMMARY OF THE INVENTION

Aspects of the disclosure are directed to systems and methods of digitally recording and reproducing tactile drawings. An exemplary method includes moving a stylus over a path on the first tactile drawing medium to form a tactile feature thereon, and digitally recording the path of the moving stylus to generate digital path data. The method also include reproducing the tactile feature on a second tactile drawing medium operably disposed in a tactile printer based on the digital path data. The systems and methods include forming tactile drawings based on a digital graphics file, including filtering the digital graphics file to form a .RLD file suitable for forming a tactile drawing having features capable of being tactilely sensed.

Another aspect of the disclosure includes the method wherein the tactile printer includes a printer stylus, and wherein the method further includes converting the digitally recorded path data to a positional (x,y) format that includes at least one delimiter symbol that indicates an up or down status of the printer stylus relative to the second tactile drawing medium, and providing the converted digitally recorded path data to the tactile printer.

Another aspect of the disclosure includes the method described above and further includes vibrating the printer stylus.

Another aspect of the disclosure includes the method described above, and further includes angling the printer stylus relative to a normal to the tactile drawing medium.

Another aspect of the disclosure includes the method described above, and further includes providing the printer stylus with a castered tip.

Another aspect of the disclosure includes the method described above, with digitally recording the path including detecting the path using a digitizing tablet.

Another aspect of the disclosure includes the method described above, and further includes detecting the path using a receiver adapted to receive signals either reflected from or transmitted by the stylus.

Another aspect of the disclosure is a method for producing a tactile drawing on a tactile drawing medium. The method includes providing a digital graphics image file representative of a graphics image. The method also includes filtering the digital graphics image file to remove features substantially incapable of being tactilely sensed if printed in the tactile drawing medium. The method additionally includes disposing the tactile drawing medium in a tactile printer and controlling the tactile printer to form the one or more tactile features on the tactile drawing medium based on the (x,y) scan path data of the filtered digital graphics image file.

Another aspect of the disclosure is the method described above and further including converting the filtered digital image file to a .RLD format that defines (x,y) scan path data, including and start and stop locations, for one or more tactile features to be formed on the tactile drawing medium.

Another aspect of the disclosure is a system for producing tactile features on a tactile drawing medium. The system has a first tactile drawing medium and a digitizing tablet having a surface that operably supports the first tactile drawing medium. The digitizing tablet is configured to digitally record a path of a stylus used to form a tactile drawing having one or more first tactile features formed on the first tactile drawing medium. The system also has a tactile printer configured with the second tactile drawing medium and configured to form on the second tactile drawing medium second one or more second tactile features that correspond to the first tactile features based on the digitally recorded stylus path.

Another aspect of the disclosure is the system as described above and further including a computer configured with instructions embodied in a computer-readable medium to process the digitally recorded path of the stylus to form a processed stylus path file having a .RLD format.

Another aspect of the disclosure is the system as described above, wherein the tactile printer includes a stylus, and wherein either a) the printer is configured to vibrate the stylus or b) the stylus itself is configured to vibrate.

Another aspect of the disclosure is a system for producing tactile features on a tactile drawing medium. The system includes a computer having a processor and a memory, and a digital graphics image file stored in memory. The digital graphics file is representative of a graphics image having one or more graphics features. The system also has instructions embodied in the processor as a computer-readable medium. The instructions cause the processor to filter the digital graphics image file to remove graphics features that would be substantially incapable of being tactilely sensed if printed in the tactile drawing medium, and to store the filtered graphics information in a .RLD file as (x,y) scan path data. The system also has a tactile printer having a movable stylus and operably connected to the computer. The tactile drawing medium is operably disposed in the tactile printer. The tactile printer is configured to receive the .RLD file from the computer and direct the stylus to form the one or more tactile features on the tactile drawing medium based on (x,y) scan path data in the .RLD file.

Additional features and advantages of the disclosure are set forth in the detailed description that follows, and in part will be readily apparent to those skilled in the art from that description or recognized by practicing the disclosure as described herein, including the detailed description that follows, the claims, as well as the appended drawings.

It is to be understood that both the foregoing general description and the following detailed description present embodiments of the disclosure are intended to provide an overview or framework for understanding the nature and character of the disclosure as it is claimed.

The claims are incorporated into and constitute part of the Detailed Description set forth below.

Figure 1:
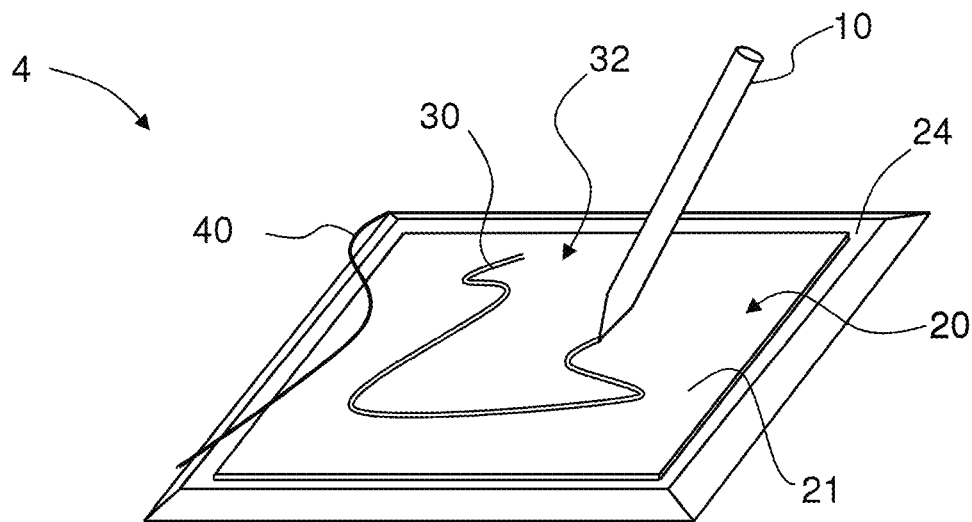
FIG. 1 is an elevated view of a prior art tactile drawing system for creating a tactile drawing in the conventional manner.

The drawings are included to provide a further understanding of the disclosure, and are incorporated into and constitute a part of this specification. The drawings illustrate various embodiments of the disclosure, and together with the description serve to explain the principles and operations of the disclosure.

DETAILED DESCRIPTION OF THE INVENTION

The present disclosure relates to tactile drawings and in particular to system and methods directed to digitizing such drawings and reproducing such drawings on a suitable medium.

The term "tactile drawing" as used herein means a drawing having one or more tactile features embodied on the surface of a tactile drawing medium, which is a medium that can support the creation of tactile features by a stylus. The preferred scale of the tactile features is defined by the ability of human users to sense by touch and feel ("tactilely sense") the tactile features as they create them. An example tactile drawing medium is one that can either permanently or semi-permanently locally deform to retain the shape of an imparted tactile feature, such as by a marking instrument, which generally referred to herein as a stylus.

In general, tactile drawings as defined herein exclude textile graphics that are not on media meant for freehand tactile drawing. An example tactile graphic medium that does not support tactile drawings is Braille embossed graphics. Braille embossed graphics are formed from discrete Braille "dots" arranged in a pattern to communicate shape or geometry tactilely. The user or reader of these tactile graphics cannot make changes to, add to, or erase tactile features on that medium, and such changes can only be made by editing the source graphic on a corresponding visual (2D) medium.

The terms "tactile drawing" and "raised-line drawing" as used herein are synonymous and are not strictly limited to raised features, but can also include indented lines and indented features.

In the discussion below, tactile drawing medium 20 is used to denote a medium on which a person draws, while tactile drawing medium 20' (with surface 21') is used to denote a tactile drawing medium that is drawn on by a tactile printer. In an example, the same tactile drawing medium 20 on which a person draws can also serve as tactile drawing medium 20'. In the discussion below, the example where tactile media 20 and 20' are not the same is emphasized for ease of discussion. Also, the stylus 10 in the tactile printer 200 is referred to in certain places as the "printer stylus" to distinguish it from a hand-held stylus. In an example, the printer stylus is in fact the same as the hand-held stylus, but need not be the same. When the term "stylus" is used, it can mean either a hand-held or a printer stylus unless the context of the discussion indicates otherwise.

Aspects of the systems and methods disclosed herein rely on the operation of a computer 260 as described below. The term computer as used herein includes a device, for example, a floppy disk drive, CD-ROM drive, DVD drive, magnetic optical disk (MOD) device (not shown), or any other digital device including a network connecting device such as an Ethernet device (not shown) for reading instructions and/or data from a computer-readable medium, such as a floppy disk, a CD-ROM, a DVD, a MOD or another digital source such as a network or the Internet, as well as yet to be developed digital means.

In another embodiment, the computer executes instructions stored in firmware (not shown). The computer is programmable to perform functions described herein, and as used herein, the term computer is not limited to just those integrated circuits referred to in the art as computers, but broadly refers to computers, processors, microcontrollers, microcomputers, programmable logic controllers, application-specific integrated circuits, and other programmable circuits, and these terms are used interchangeably herein.

Software may implement or aid in performing the disclosed tactile drawing methods as disclosed herein. The software may be operably installed in computer 260 or the processor unit 262 described below. Software functionalities may involve programming, including executable code, and such functionalities may be used to implement the methods disclosed herein. Such software code is executable by the general-purpose computer or by the processor unit described below. In operation, the code and possibly the associated data records are stored within a general-purpose computer platform, within the processor unit, or in local memory. At other times, however, the software may be stored at other locations and/or transported for loading into the appropriate general-purpose computer systems. Hence, the embodiments discussed herein involve one or more software products in the form of one or more modules of code carried by at least one machine-readable medium. Execution of such code by a processor of the computer system or by the processor unit enables the platform to implement the catalog and/or software downloading functions, in essentially the manner performed in the embodiments discussed and illustrated herein.

The computer and/or processor as discussed below may each employ a computer-readable medium or machine-readable medium, which refers to any medium that participates in providing instructions to a processor for execution, including for example, converting raw path data to processed path data in .RLD format, as explained below. Any memory discussed below constitutes a computer-readable medium. Such a medium may take many forms, including but not limited to, non-volatile media, volatile media, and transmission media. Non-volatile media include, for example, optical or magnetic disks, such as any of the storage devices in any computer(s) operating as one of the server platforms, discussed above. Volatile media include dynamic memory, such as main memory of such a computer platform. Physical transmission media include coaxial cables; copper wire and fiber optics, including the wires that comprise a bus within a computer system.

Common forms of computer-readable media therefore include, for example: a floppy disk, a flexible disk, hard disk, magnetic tape, any other magnetic medium, a CD-ROM, DVD, any other optical medium, less commonly used media such as punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Figure 2A:
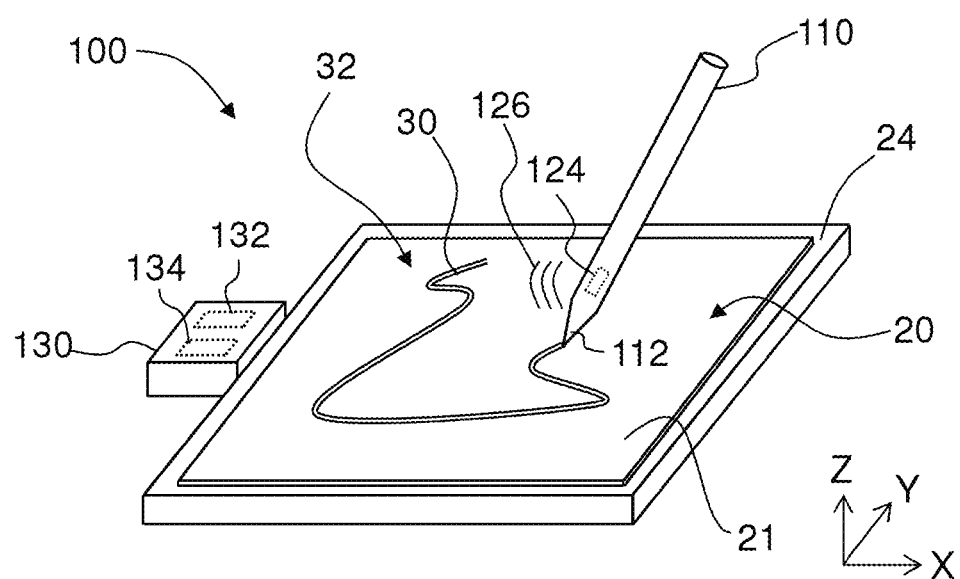
FIG. 2A is an elevated view of an example embodiment of a tactile drawing digital recording system according to the disclosure that employs a position-recording device in the form of a receiver.

FIG. 2A is an elevated view of an example embodiment of the tactile drawing digital recording system ("system") 100 according to the disclosure. System 100 includes a stylus 110 with a tip 112. In an example, stylus 110 is includes a transmitter 124 that transmits signals 126. System 100 also includes a position-recording device 130, which is shown in FIG. 2A as being in the form of a receiver 130R. Stylus 110 is configured so that transmitter 124 transmits signals SR to receiver 130R as it moves over tactile drawing medium 20 and forms tactile feature 30 thereon. In in alternate embodiment, transmitter 124 is adapted to reflect signals 126, which can be generated by receiver 130R. In an example, the (x,y) position of stylus tip 112 is determined by triangulation based on signals 126. The combination of tactile drawing medium 20 with tactile features formed thereon constitute a tactile drawing (or raised-line drawing) 32.

An example receiver 130R includes a processor 142 (e.g., a microprocessor) and a memory unit ("memory") 134. Processor 132 is configured to receive signals 124 and perform a calculation that yields the (x,y) positions of stylus tip 112 as it moves over tactile drawing medium 20 to form tactile feature 30 and tactile drawing 32. The (x,y) positions define path information for stylus tip 112 relative to a reference location. This path information can be stored in memory 134 and/or can be transmitted to another device, such as a computer 260, as discussed below. In an example, the path information (or a processed version of the path information, as described below) can be stored in a portable memory device 134P, such as a thumb drive, CD, etc.

An exemplary receiver 130R and stylus 110 is the digital pen and tablet device from Logipen. An example system 100 can be built around a standard raised line graphics kit, e.g. The Draftsman, which is sold in the United States by The American Printing House for the Blind. In an example, stylus tip 112 can be a ball-point tip such as used in a conventional ball-point pen, or can be configured to have a solid, rounded or otherwise shaped end suitable for indenting or otherwise deforming tactile drawing medium 20.

Figure 2B:
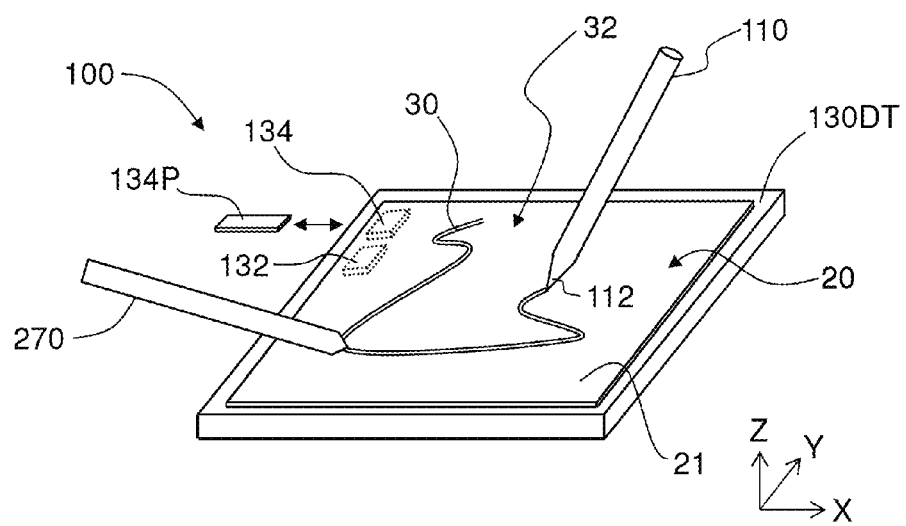
FIG. 2B is an elevated view of another example embodiment of the tactile drawing digital recording system according to the disclosure that employs a position recording device in the form of a digitizing tablet.

FIG. 2B is similar to FIG. 2A and illustrates an example embodiment of system 100 wherein position recording device 130 is in the form of a digitizing tablet 130DT. An example digitizing tablet 130DT suitable for use in system 100 is the WACOM INTUOS4 available from Wacom Co. Ltd., based in Tokyo, Japan. Digitizing table 130DT is configured to record the (x,y) positions of stylus tip 112 when forming tactile feature 30 in tactile drawing medium 20 to establish path information (i.e., (x,y) data) of the tip over the tactile drawing medium. As in the case of receiver 130R, this path information can be stored in memory 134 and/or can be transmitted to another device, such as computer 260, as discussed below.

In an example, digitizing tablet 130 is a conventional digital tablet that is altered to record (x,y) coordinates on tactile drawing medium 20. A conventional digital tablet does not have a built-in visual interface and relies on the user being able to see the motion of stylus 10 on a display, such as computer display 264 (see FIG. 3B).

Creating tactile features (or "raised lines") 30 in tactile drawing medium to form tactile drawing 32 as disclosed herein imposes certain limitations on the type of digitizing tablet 130T that can be used. Because tactile features 30 are formed in tactile drawing medium 20 that resides between the digitizing tablet and stylus 110, the method for digitizing the stylus path is not based on physical contact between the stylus and the digitizing tablet. Instead, the process for digitizing the stylus path is carried out by stylus 10 either sensing, interacting with or producing a magnetic field (or electromagnetic field) that communicates with the underlying digitizing tablet. This method is largely spatially independent, i.e., the distance between the drawing surface and the tablet can be increased without affecting the results.

In general, digitizing tablets 130DT have an internal memory for saving work and only usually can save digital image files, such as bitmap files. Thus, in an example embodiment, a real-time conversion from pixel data in a digital image to (x,y) stylus path coordinates on tactile drawing medium 20 is performed. This includes establishing a sampling frequency, and recording a vector array anytime a user is drawing on tactile drawing medium 20. The digitizing tablet 130DT is usually capable of registering when stylus 10 is up (i.e., not in contact with tactile drawing medium 20) and when it is down (i.e., in contact with tactile drawing medium 20).

The initial (x,y) stylus path information is referred to herein as raw path data. In an example, the raw path data is converted to processed path data suitable for instructing a tactile printer to carry out the tactile printing of the recorded tactile feature onto another tactile drawing medium 20. In an example, the processed path data has a ".RLD" format that is similar to or the same as a Comma Separated Variables format (.CSV). and, in general, only contains 3 types of information: the (x,y) coordinates as scalar values, and a delimiter symbol to denote the start and end of tactile features. The delimiter symbol is an arbitrary symbol, and in the discussion below is an exclamation point "!". In another example, additional information types could be added to the ".RLD" file format to code more detailed aspects of tactile drawings. These details could include, for example, the thickness or height of tactile features comprising a tactile drawing.

Thus, system 100 allows a user to draw directly on tactile drawing medium 20 to create tactile feature 30 and have a digital representation of the tactile feature recorded and stored in memory 134 in a manner that can then be communicated to another device, such as a tactile printer. The tactile printer can then reproduce tactile feature 30 in another tactile drawing medium 20'.

Figure 3A:
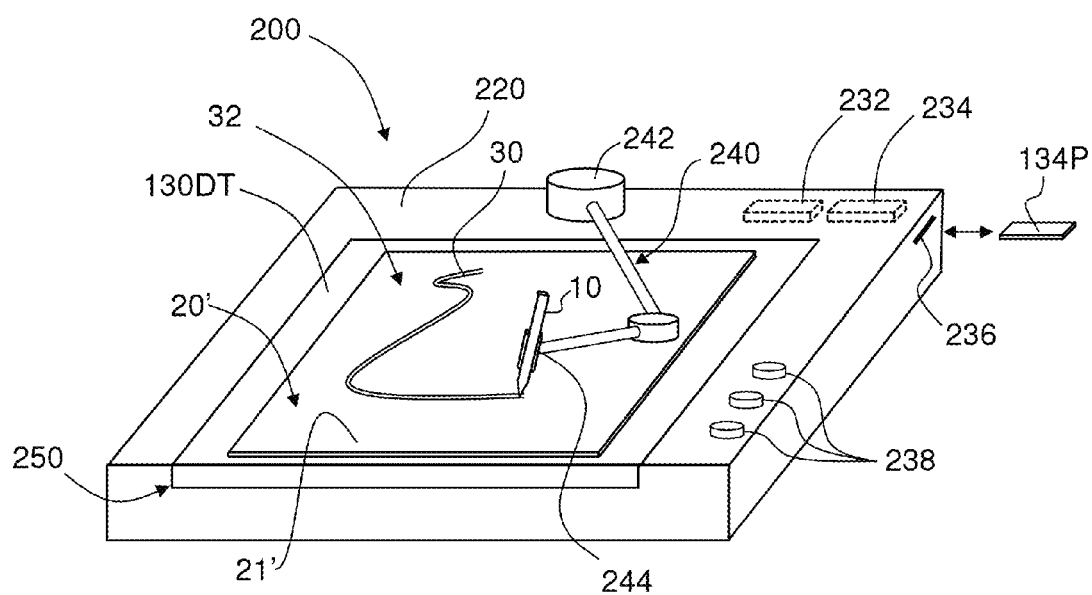
FIG. 3A is an elevated view of an example tactile printer in the form of a plotter.

FIG. 3A is an elevated view of an example tactile printer 200 in the form of a plotter. Tactile printer 200 includes a frame 220 that operably supports a processor 232, a memory 234, a data port 236 and control features 238 (e.g., buttons) that control the basic operations of the tactile printer. Frame 220 operably supports a movable plotter arm 240 having a proximal end 242 connected to the frame and having a distal end configured to hold a printer stylus 10, which can be a conventional stylus. Frame 220 includes a central recess 250 configured to accommodate digitizing tablet 130DT so that tactile drawing medium 20' can be supported thereon in an operable position relative to plotter arm 240. In one example, frame 220 is configured to allow for digitizing tablet 130DT to be electrically connected to processor 232 and memory 234, e.g., in a docking configuration.

Memory 234 can be used to receive the processed path data (e.g., via portable memory device 134P, via wireless or wired transmission, etc.) generated by system 100. Processor 232 is configured to receive the processed path data and in response thereto direct movable plotter arm 240 to move printer stylus 10 over (new) tactile drawing medium 20' to reproduce the recorded tactile feature 30 in the new tactile drawing medium. Control features 238 can be used to control the basic operation of plotter system 200, e.g., direct plotter arm 240 to return to a rest position as tactile drawing medium 20' is disposed onto digitizing tablet 130DT.

Figure 3B:
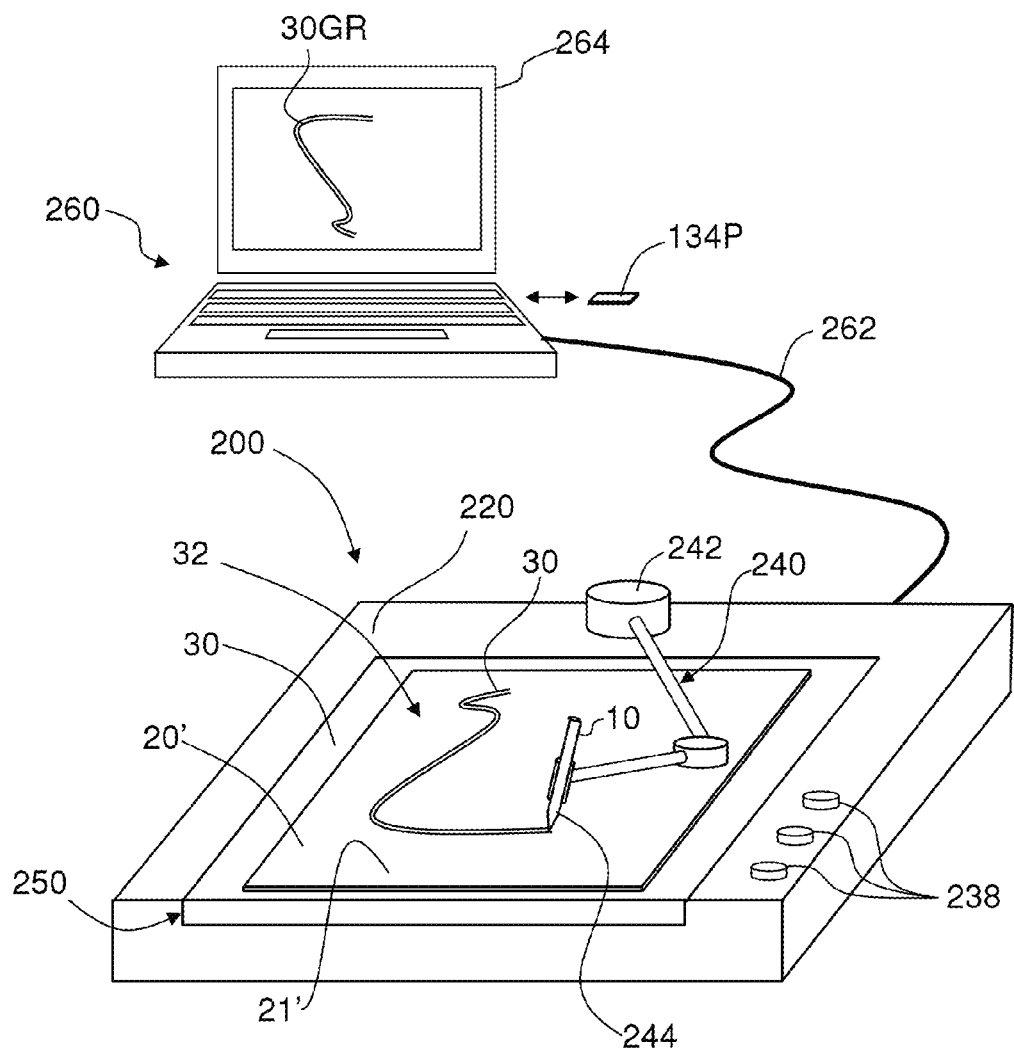
FIG. 3B is similar to FIG. 3A and illustrates an example embodiment wherein the tactile printer is operably connected to a computer.

FIG. 3B is similar to FIG. 3A and illustrates another example embodiment wherein Tactile printer 200 is operably connected to a computer 260 (e.g., a laptop computer, desktop computer, smartphone, etc.). The operable connection is shown by way of example as a cable 262 (which can be electrical or optical), but the connection can also be wireless. Computer 260 includes (or is operably connected to) a display 264 that allows for a visual graphical representation 30GR of tactile feature 30 to be displayed based on the processed path data.

Figure 3C:
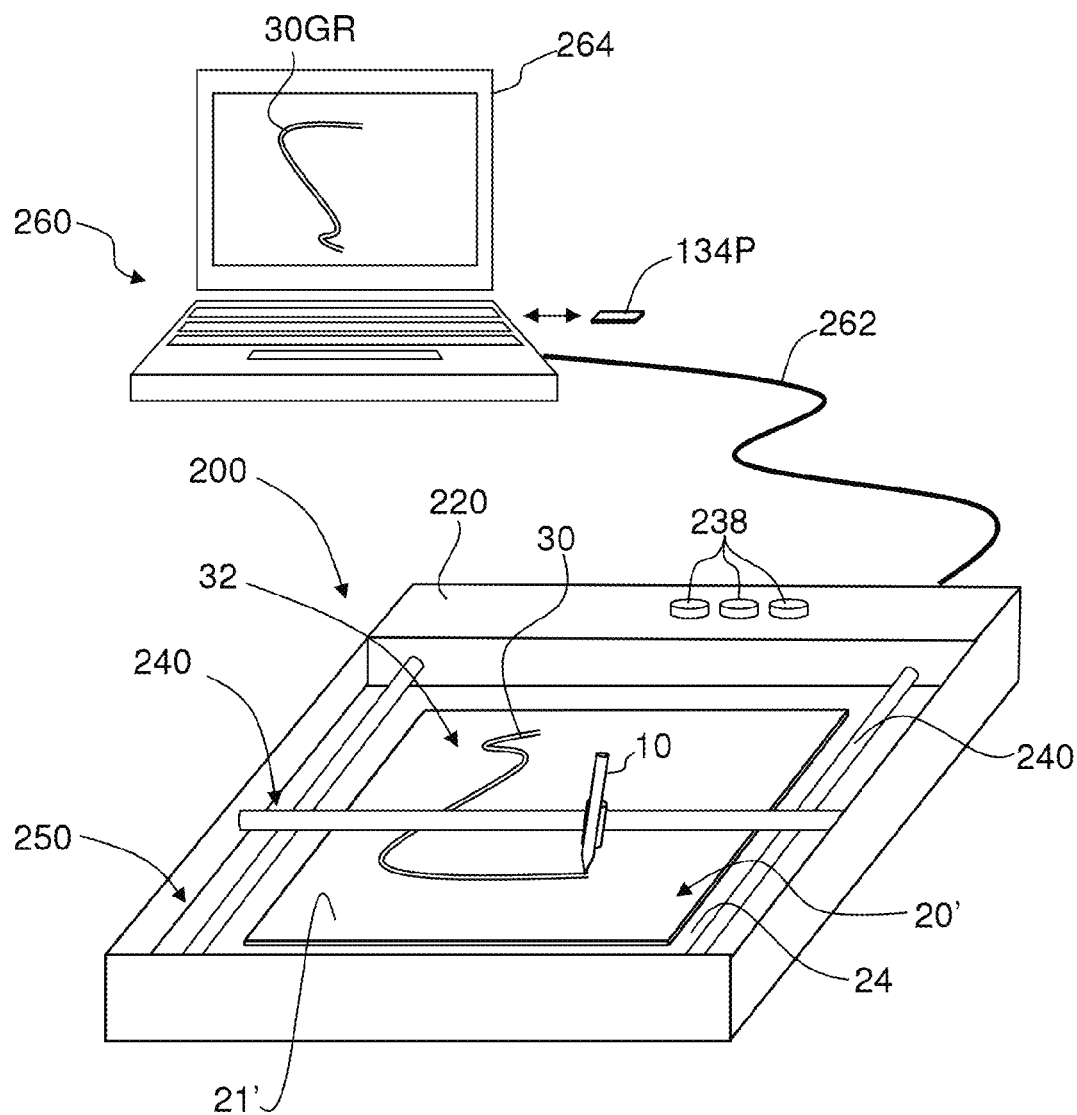
FIG. 3C is similar to FIG. 3B, wherein tactile printing is accomplished via a rail system.

FIG. 3C is similar to FIG. 3B and illustrates an alternate example embodiment of tactile printer 200 wherein the movable plotter arm 240 of FIG. 4B is replaced by a rail system 246.

Figure 4:
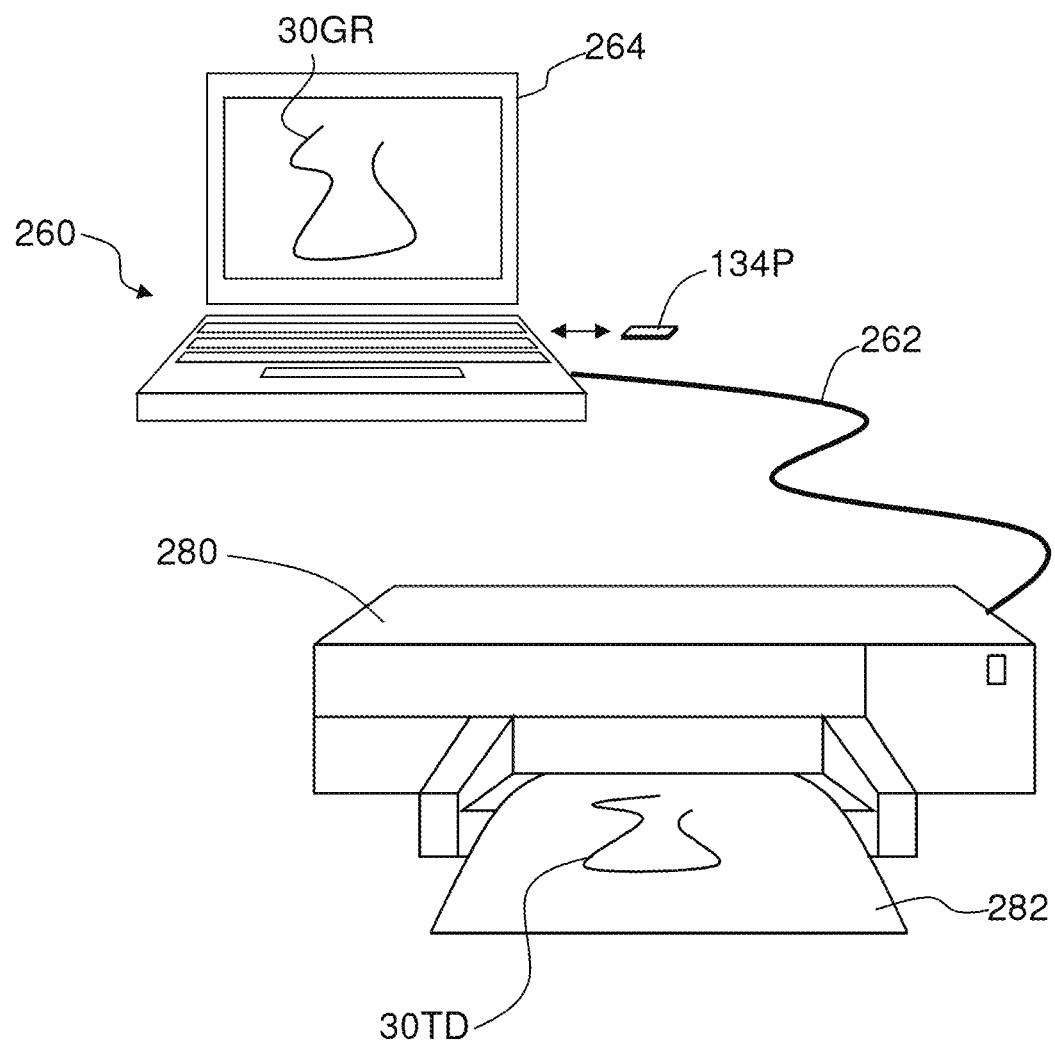
FIG. 4 is similar to FIG. 3B and FIG. 3C and illustrates an example embodiment where a computer is operably connected to a conventional printer to print the tactile feature onto plain paper as a conventional two-dimensional drawing.

FIG. 4 is similar to FIG. 3B and FIG. 3C and illustrates an example embodiment where computer 260 is operably connected to a conventional printer 280 to print the graphical representation 30GR of tactile feature 30 onto plain paper 282 as a two-dimensional drawing 30TD. This allows a tactile feature 30 to be captured as a graphical representation in the manner described above, and then reproduced in hardcopy form as a conventional two-dimensional image.

Figure 5:
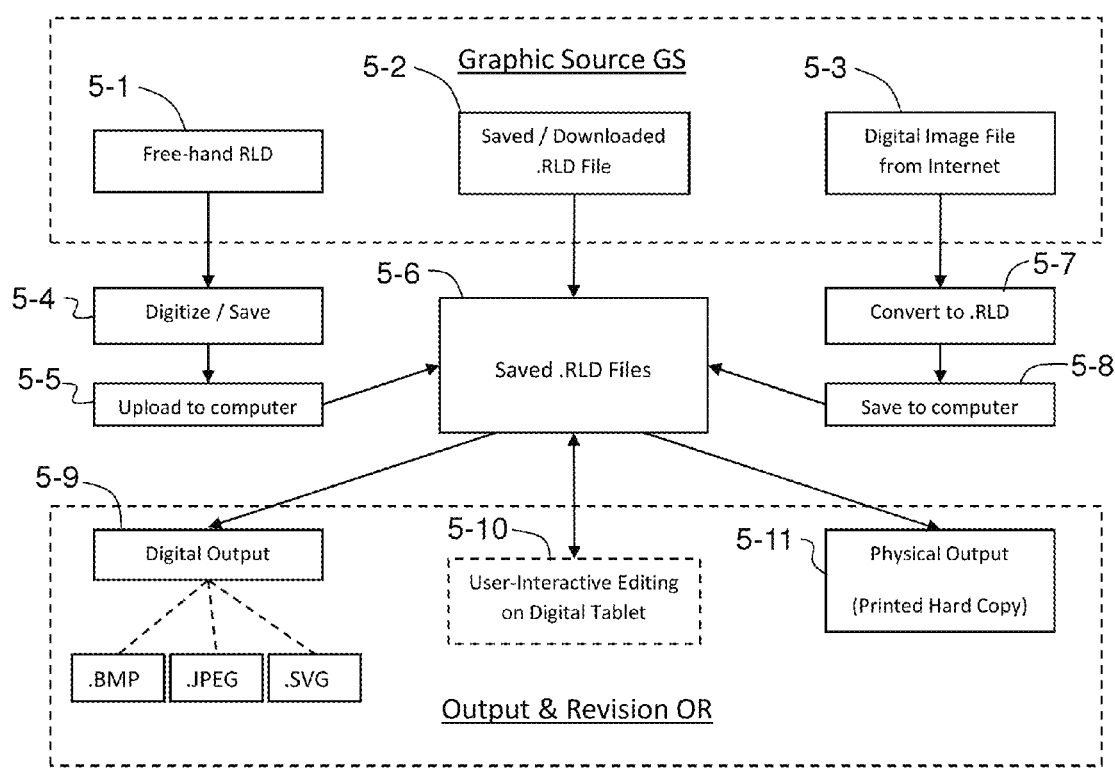
FIG. 5 is a flow diagram that illustrates an example flow of tactile drawing information in the tactile drawing digital recording system disclosed herein.

FIG. 5 is a flow diagram that illustrates an example flow of tactile drawing information ("RLD" information) in system 100. In the graphics source box GS, the RLD information can be generated by free-hand drawing (box 5-1) using system 100 as described above. In addition, an existing .RLD file can be retrieved and downloaded, e.g., to a computer, as indicated in box 5-2. Also, a digital image file from the Internet can be retrieved and download, as indicated in box 5-3.

In the case of the free-hand RLD information, the RLD information is digitized and saved as raw path data (box 5-4), and then uploaded to a computer (box 5-5), which converts the raw path data into processed path data having a .RLD file format (box 5-6). Likewise, a digital image from the Internet is also converted to a .RLD file format (box 5-7) and then saved to computer 260 (boxes 5-8 and 5-6).

The saved .RLD files (box 5-6) can be utilized in a number ways that are illustrated in the Output & Revision box OR. In a first example, the .RLD file can be converted to a digital output (box 5-9) as a .BMP, .JPEG, .SVG or other file format. In a second example, the .RLD file is edited interactively by a user (box 5-10), e.g., by printing onto the digital tablet 130DT, specifically onto tactile drawing medium 20', and then adding, erasing or revising particular tactile features comprising the printed .RLD file. In a third example, the .RLD file is used to create a "physical output," (box 5-11) e.g., print out a hardcopy of the .RLD file on tactile drawing medium 20' via tactile printer 200 to form tactile drawing 32 (e.g., FIGS. 3A through 3C), or a two-dimensional image 30TD on paper 282 using conventional printer 280 (FIG. 4).

In an example, the user-interactive editing is carried out using a digitizing tablet 130DT, stylus 10, computer 260, and an RLD eraser 270 (see FIG. 2B), the latter being disclosed in U.S. Provisional Patent Application 61/482,175, filed on May 3, 2011, and in the aforementioned corresponding U.S. patent application Ser. No. 13/685,002, filed on Nov. 26, 2012, and U.S. patent application Ser. No. 13/457, 725, filed on Apr. 27, 2012. The RLD eraser allows the user to erase, add and revise raised lines on the tactile drawing medium 20 and thus in any .RLD file.

In an example, this is accomplished by printing tactile drawing 32. Then, the .RLD file for this tactile drawing 32 is edited by drawing and erasing on the tactile drawing as mounted on digitizing tablet 130T (see FIG. 2B). This process works much in the same way as the digitizing process when the RLD drawing is first created.

In this example, a user would print a .RLD file onto the digitizing tablet DT30, which would remain in communication with computer 260. As the user adds tactile features, digitizing tablet DT30 interprets the x-y coordinates by the process described herein, but instead of saving this data to local memory, data is sent to the running software on the computer. Similarly, when the user is erasing, digitizing tablet DT30 recognizes the erasing and prompts the software to erase the lines at the corresponding coordinates in the .RLD file.

In an example, digital recognition and recording of the eraser's coordinates is accomplished with the same process as the recording of new raised-line (tactile) feature 30. The eraser 270 sends a distinguishable signal to the digital tablet 130DT to indicate that tactile features are being erased or removed from the current .RLD file. In another example, where digitizing tablet DT30 is not connected to computer 260, the digitized erasing 270 works in the same way, but instead it removes the erased coordinates from the "Raw Path Data" before these coordinates are converted into .RLD files.

Figure 6:
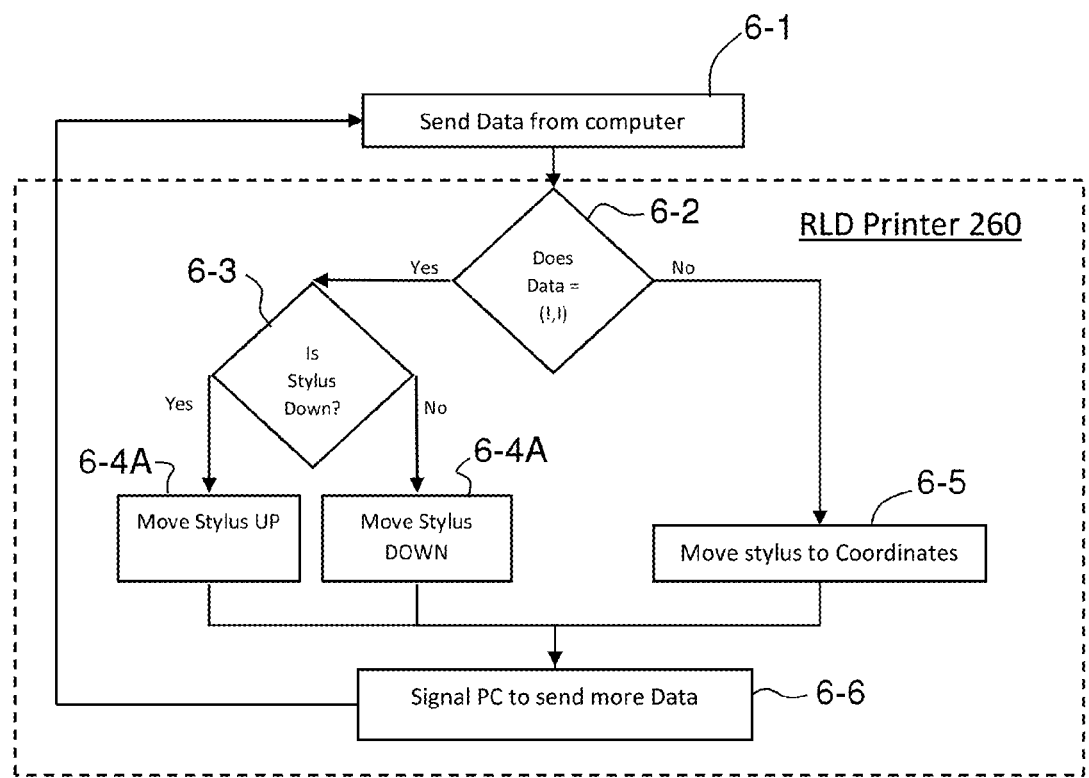
FIG. 6 is a flow diagram that illustrates an example of how the information in the .RLD file is provided to the tactile printer to produce a tactile feature on a tactile drawing medium.

FIG. 6 is a flow diagram that illustrates an example of how the .RLD information is provided to tactile printer 200 and how it is used by tactile printer to print a tactile feature. Table 1 below indicates how the position data in the .RLD file translates into an action for tactile printer 200 to create one or more tactile features 30 on tactile drawing medium 20'. In Table 1, "A" and "B" are numerical (scalar) values, as opposed to being the delimiting symbol "!".

TABLE 1

.RLD data and printer action

| DATA | PRINTER ACTION |
| --- | --- |
| (x, y) = (A , B) | Move to Column # A and Row # B |
| (!, !) | If Stylus is UP, then move stylus DOWN |
|  | If Stylus is DOWN, then move stylus UP |

In an example, tactile printer 200 includes internal software that manages positioning stylus 10 (e.g., via motor control of X and Y actuators), as well as the raising and lowering of the stylus to start and end a given tactile feature 30. In an example, tactile printer 200 receives one piece of position data at a time, and when it has executed the command that corresponds with the received data, it signals to computer 260 to send the next piece of position data.

Thus, with continuing reference to FIG. 6, in step 6-1, the data from the .RLD file is sent by computer 260 to tactile printer 200. Then in step 6-2, the tactile printer 200 (and specifically processor 232 therein) checks to see whether the data has delimiters, e.g., is in the form (!,!). If the answer is "yes", then the process proceeds to step 6-3, which asks whether stylus 10 is down. If the answer is "yes", then in step 6-4A the stylus is moved UP (i.e., lifted), and if the answer is "no", then in step 6-4B the stylus is moved DOWN.

Referring back now to step 6-2, if the answer there is "no," then the data includes (x,y) position information, and in step 6-5, processor 232 directs tactile printer 200 to move stylus 10 to the (x,y) coordinate provided. Once this step is carried out, then in step 6-6, processor 232 directs the tactile printer 200 to send a signal to computer 260 to send more data per step 6-1.

Figure 7:
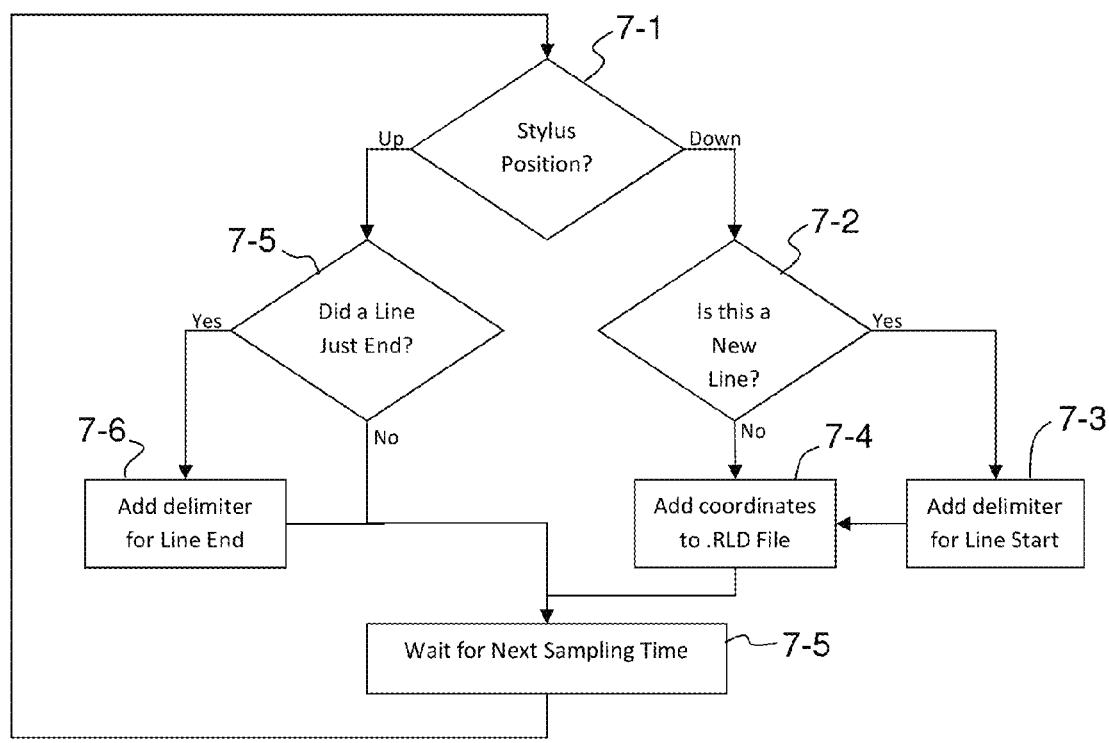
FIG. 7 is a flow diagram an example method of creating a .RLD file using tactile drawing data obtained by a digitizing tablet.

FIG. 7 is a flow diagram an example method of creating a .RLD file using data obtained from digitizing tablet 130T. In step 7-1, digitizing table 130T senses the position of printer stylus 110, i.e., whether it is up (i.e., not in contact with tactile drawing medium 20') or down (in contact with tactile drawing medium 20'). If printer stylus 110 is down, then in step 7-2 the method inquires whether a new tactile feature 30 is being created. If the answer is yes, then in step 7-3 a delimiter is added to the data to indicate the start of a new tactile feature, and then in step 7-4 the coordinates are added to the .RLD file. Then in step 7-5, the system waits for the next sampling time and returns to step 7-1. If the answer is no, then the coordinates are added directly to the .RLD file in step 7-4 without adding a delimiter, and the process goes to step 7-4, then to step 7-5 and then back to step 7-1.

If in step 7-1, if printer stylus 110 is up, then in step 7-5 the method inquires whether a tactile feature 30 just ended. If the answer is yes, then in step 7-6, a delimiter is added, and the method proceeds to step 7-5 to wait for the next sampling time, and then back to initial step 7-1.

Handling Narrow Features and Detailed Graphics

The .RLD format is similar to a vector graphic format in that the width of the tactile features described in the .RLD file is non-dimensional. This means that that the width of lines is represented by a single pixel and does not scale up or down even when the image is enlarged or reduced. The thickness as well as the spacing of adjacent tactile features 30 is important for applications involving blind or visually impaired users because the ability of such users to sense tactile features accurately is limited. For example, the minimum spacing for which two adjacent line-type tactile features 30 are discernible is about ⅛".

Thus, in an example embodiment, system 100 is configured to prevent the printing of two non-intersecting tactile features 30 spaced too closely. In the situation where the data for printing tactile features 32RL is obtained from a digital image, i.e. .BMP, .JPEG, .SVG, or other file formats of digital graphics, any closely spaced features of the digital image are thinned prior to being converted to .RLD format. This is essential because .RLD files do not have line thicknesses information. This format utilizes only the (x,y) coordinates of the sequence of points on the raised-line drawing.

In another embodiment, computer 260 is configured to shrink image-based lines. This is accomplished by shrinking the image to a fraction of its original size, i.e., reducing the image to a smaller scale, thereby thinning lines and eliminating the smallest features. This method of line-thinning is permissible due to the limits of tactile perception. The resolution of a graphic needed to create tactile features 30 is much lower than that associated with a standard digital graphics file, i.e. it includes less fine detail. Thus, when a digital image is converted to a .RLD file after being shrunk, the high-spatial-frequency detailed features end up filtered out of the image since they represent details that would be imperceptible on a tactile drawing 32. Thus, the reduction in the resolution that occurs from transitioning from a standard digital graphics file to a tactile drawing file (i.e., the .RLD file) proves advantageous for creating a tactile drawing 32. For that reason, in an example, system 100 is configured so that very small lines are not included in the .RLD files.

Figure 8A:
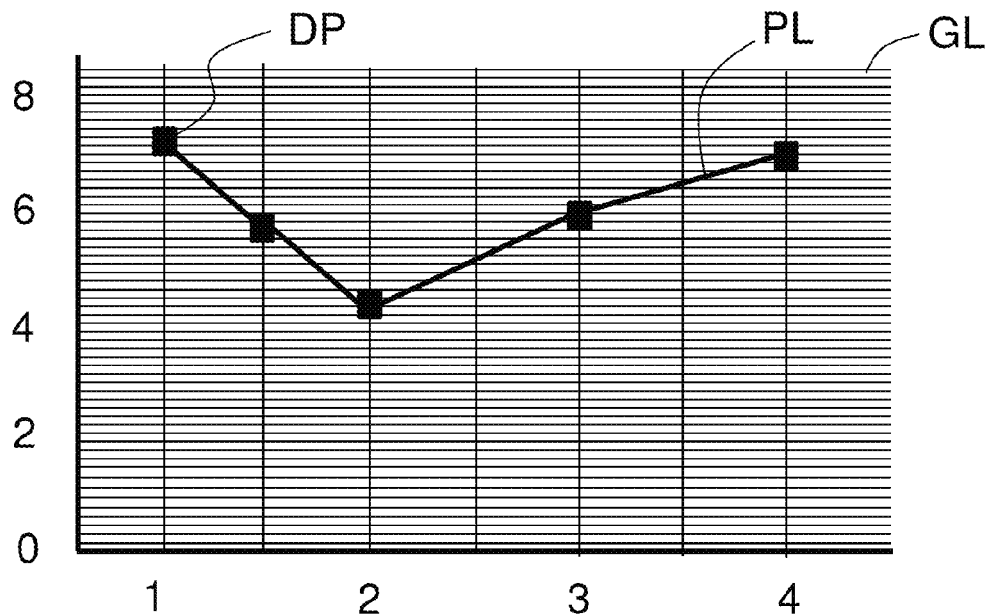
FIG. 8A and FIG. 8B are example of line graphs, with FIG. 8A being the more detailed graph associated with a graphics image and FIG. 8B being the less detailed tactile representation of the graphics image as embodied on a tactile drawing medium.
Figure 8B:
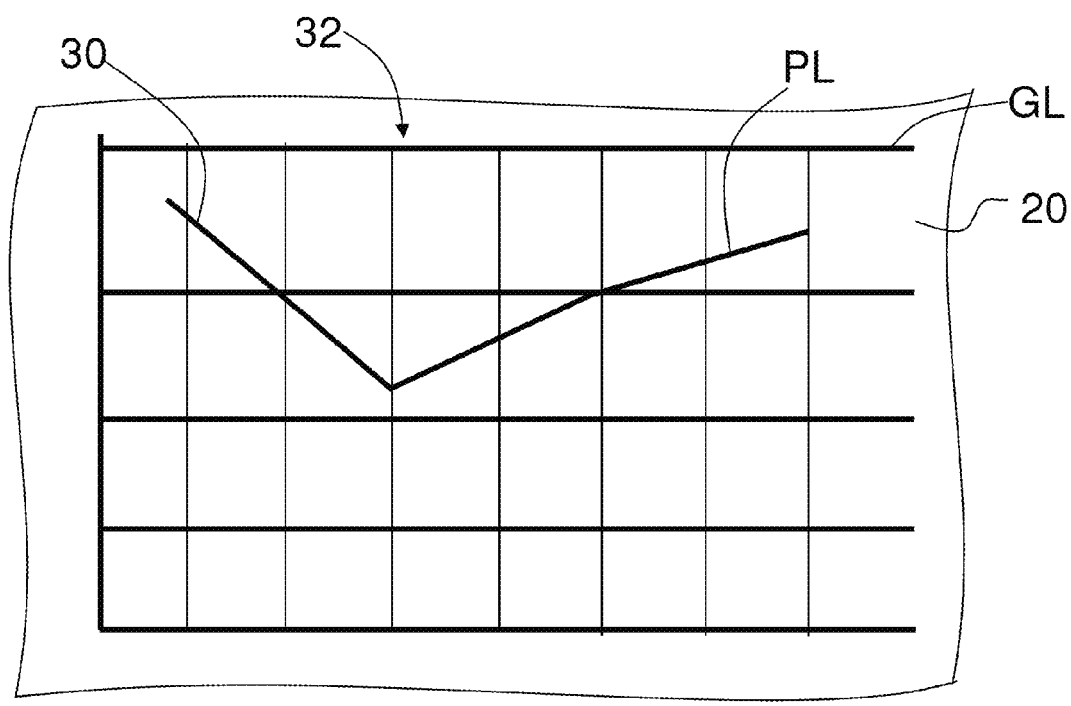

FIG. 8A and FIG. 8B are example line graphs, complete with grid lines. FIG. 8A is the more detailed original graph and FIG. 8B is a less detailed processed and printed tactile drawing 32. The line graph of FIG. 8A has gridlines, axes, marks, numerical labeling, and perhaps text labels. In the processing to obtain the .RLD file (FIG. 8B), all lines under a certain length and width and features below a certain size have been filtered out.

While the essential numerical information is the same in these two graphs, the quantity and resolution of information is very different. The .RLD file used to form the tactile features 30 that form the graph of FIG. 8A as tactile drawing 32 only communicates the essential information, i.e. the plotted line PL and a select few of the gridlines GL. The digital graphic of FIG. 8A by contrast communicates more information, including all of the gridlines GL, the axis labels and the actual data points DP.

While these details may be desirable in ordinary circumstances, if they were included in a tactile drawing 32, it would obscure valuable information for someone who needs to perceive the essential information tactilely.

Optimal Drawing Path

Once a graphics image has been converted to a graphics file having resolution suitable for tactile graphic printing, then in an example embodiment of the method, an optimal drawing path is determined for creating tactile drawing 32 on tactile drawing medium 20'. The optical drawing path (ODP) is used to draw one or more tactile features 30, and determines the order in which graphic data is saved into a .RLD file. The ODP is saved as two arrays containing (x,y) vector coordinates for the feature being analyzed. These arrays, along with delimiters to signal where the tactile features 30 begin and end, make up the .RLD file that is representative of the image.

Figure 9:
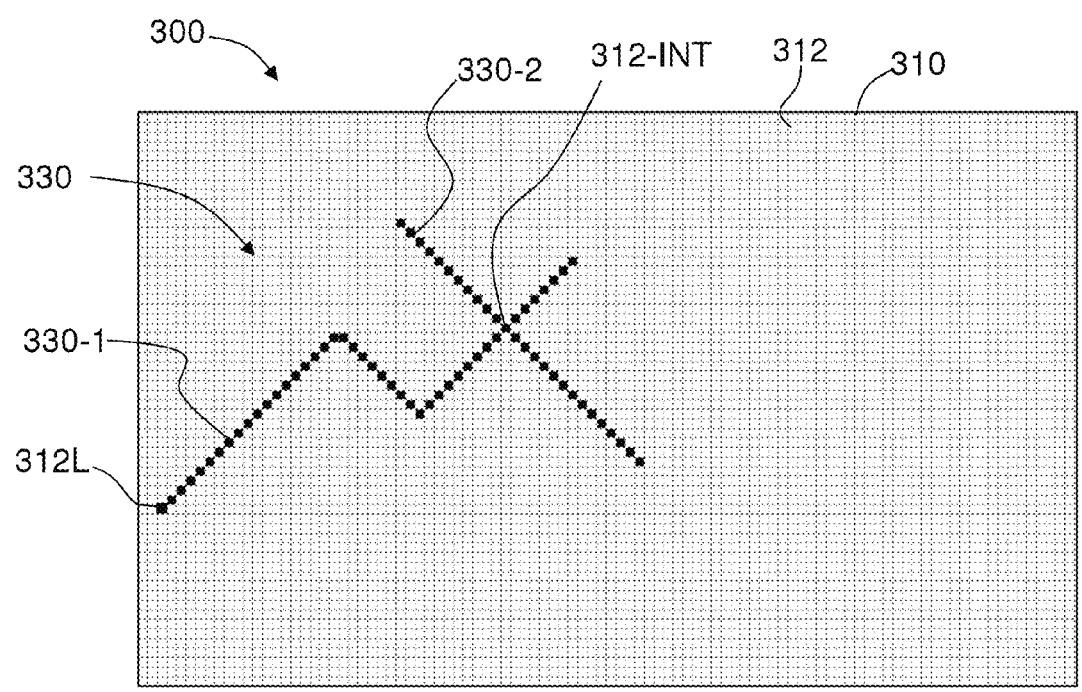
FIG. 9 is a representative digital graphics image that includes two line segments, with a pixelated background that is used to identify and locate (filled-in) pixels that form the line segments.

FIG. 9 is a representative graphics image 300 that includes two line segments 310, denoted 310-1 and 310-2. A pixelated grid 310 is shown that includes pixels 312. Line segments 310-1 and 310-2 are defined by black pixels 312. The first step in preparing the .RLD file from graphics image 300 involves finding the beginning (start) of a first line 310-1 in the image based on pixel location. In an example, the search seeks line segments by scanning from top downward and from left to right, so the left-most black pixel (312L) is recognized as a start position for line 310-1. If two black pixels share the same column, the top-most or upper pixel is recognized as being first. The search for line pixels proceeds from the top to the bottom of a single column before moving on to the next column to its right.

Figure 10A:
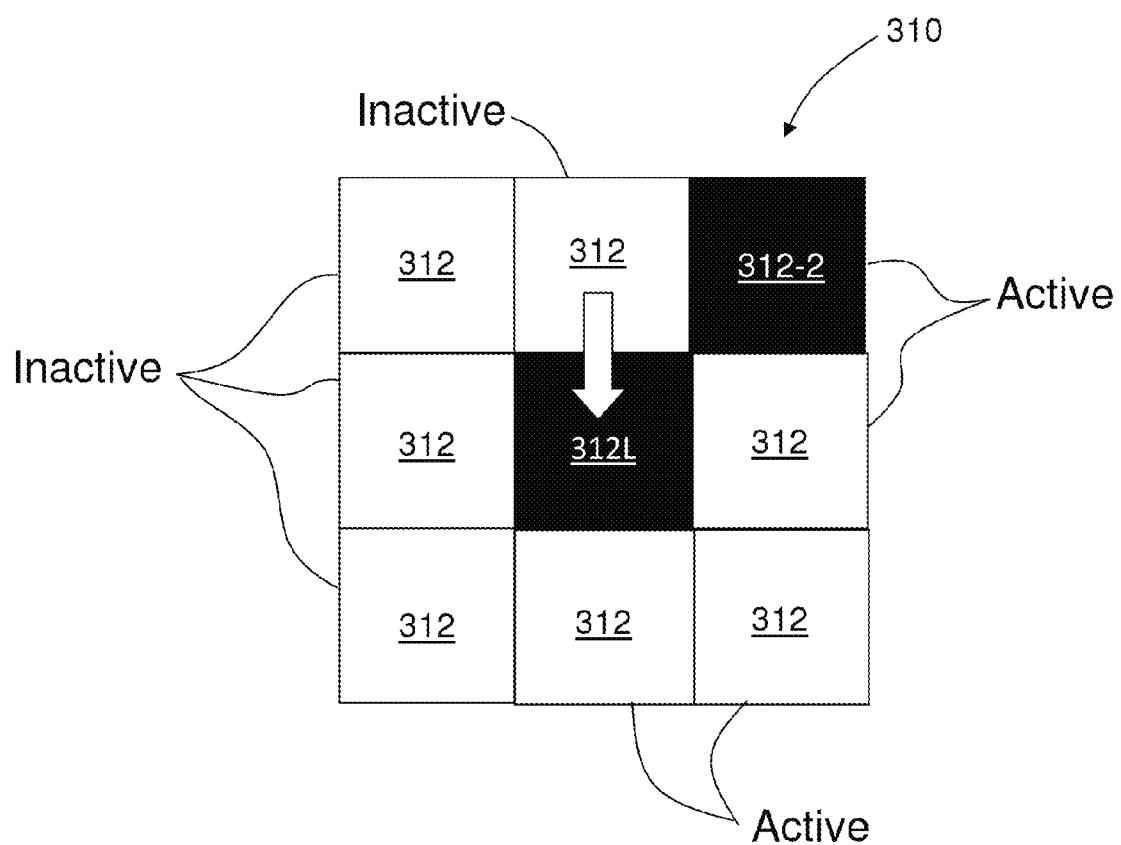
FIG. 10A through FIG. 10D are close-up views of pixels in the representative digital graphics image of FIG. 9, illustrating how the pixels are searched to identify and locate the pixels that form the line segments.

When the start location pixel 312L is found, a line 310 (here, line 310-1) is traced and identified. Because the start location pixel 312L is always found by searching in a downward-and-right direction, only four neighboring pixels can be the next point along the line 310-1. FIG. 10A illustrates start location pixel 312L and the eight surrounding pixels 312. Of the eight surrounding pixels, four have not yet been scanned; these pixels are called "active pixels" or "active cells." The other four neighboring pixels that have already been scanned are declared "white" by the first passes of the downward-and-right process and are considered "Inactive pixels" or "inactive cells." The white arrow in FIG. 10A shows the direction in which the scanning of the image pixels 312 is carried out. The second pixel 312 that makes up the second pixel in line 310-1 is denoted 312-2

Figure 10B:
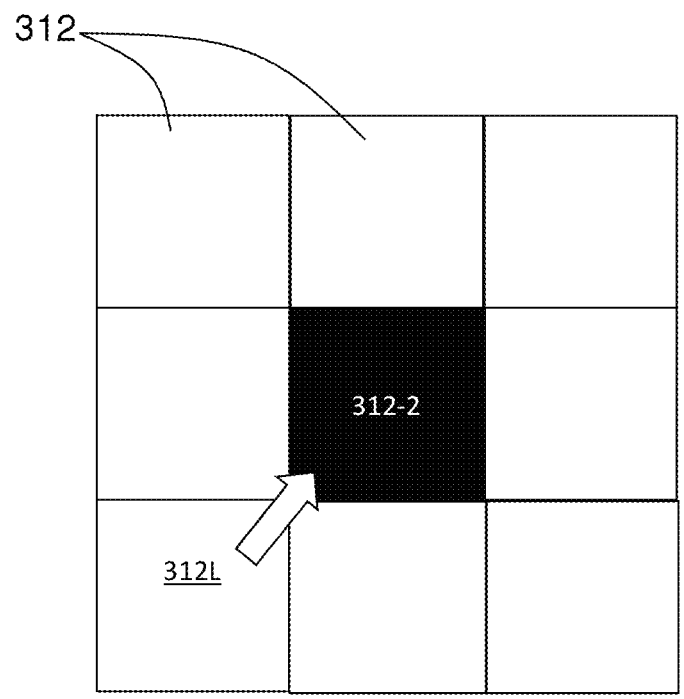
Figure 10C:
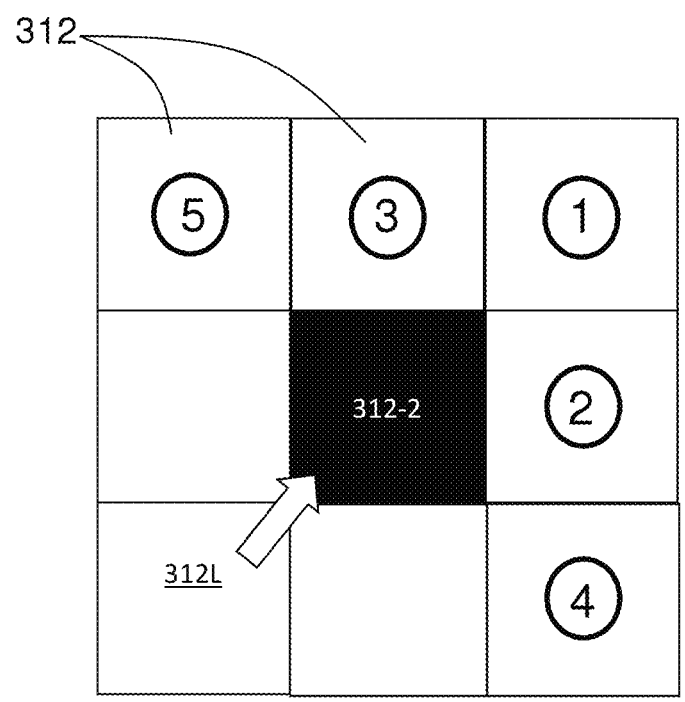

Thus, the searching for next-in-line pixels is based on a 3×3 grid of pixels 312 centered at the current pixel, which is shown as start pixel 312L. The searching of active pixels starts directly below the start pixel 312L. If that cell is "white" (i.e., not part of a graphics line), then the cell is designated as "inactive." The searching continues in the counterclockwise direction. When the next point 312-2 on line 310 is identified, the searching continues to ensure that there are no other pixels 312 neighboring the center cell 312L. If there is more than one neighboring pixel, that implies that the line being traced is intersecting another line, and so the pixel is designated as an "intersection" 312-INT, as shown in FIG. 10C.

Once a pixel 312 has been classified as an Intersection 312-INT or not an Intersection, the (x,y) pixel coordinates are saved in the .RLD file. Because the (x,y) point in this example is the start of the line 310, a delimiter is used to note that this point is the beginning of a line. The Table below shows how the .RLD file stores the data.

TABLE 2

Start data for line 310-1 of FIG. 9

| X-pixel coordinate | Y-pixel coordinate | |
|---|---|---|
| ! | ! | Start of line |
| 3 | 42 | Line starts at (x, y) = (3, 42) |

After the center pixel's coordinates are saved in the .RLD file, the next-in-line pixel search grid centers on the next pixel in line, i.e., the one just identified as 312-2. When the center pixel is redefined, the former center pixel is "erased," or made white, in graphics image 300 being converted. This way, the new grid search does not misidentify this pixel as a part of another line. This is illustrated in FIG. 10B. Essentially, when the data for any given pixel is stored in the .RLD file, the pixel in the corresponding digital image is "erased" to avoid re-identification.

Continuing the process after finding the start (first) pixel 312L and the second Pixel 312-2 is slightly different. The essential change is that the active and inactive pixels in searching for the next-in-line pixel are different. While trying to find the second pixel 312-2 from the start pixel 312L, the method ignores the four neighboring pixels it has already checked while searching for the starting pixel. In contrast, it is not known what neighboring pixels have been already searched while advancing through the pixels in middle of line 310-1. Consequently, active and inactive pixels are defined directionally by assuming that lines continue in a relatively consistent direction. Neighboring pixels that are along the lines current trajectory are thus searched for. This can be done remembering the direction from the previous to current pixel and continuing to search for the next pixel in the neighborhood of that angle.

In addition to designating pixels 312 as active or inactive, the method also determines the order in which to analyze neighboring pixels. The method first checks to see if the line through the center pixel 312 is straight, meaning that the previous pixel and the next pixel in the line are on opposite sides of the center pixel. Then, it continues from there in a predetermined order to check the remaining four active pixels 312. An example of this ordered search is shown in FIG. 10, with the ordering shown as circled numbers 1 through 5. This directional priority greatly reduces the processing time required to convert graphics image 300 into the .RLD File Format.

Once the next-in-line pixel 312 is found, the method proceeds as described above, i.e., the center pixel is evaluated to see if it is at an intersection. If not, the coordinates of the current center pixel 312 are saved in the .RLD file, the next pixel is then made the center pixel, and the previous center pixel is "erased" from the graphics image 300. This process iterates until the entire graphics image 300 is converted to .RLD data stored in the .RLD file. It is noted that if the next pixel 312 in any of the active cells cannot be identified, it is assumed that the center cell is the last pixel in the line, and adds a "!" delimiter to the .RLD file to indicate that the line is terminated at that location.

Figure 10D:
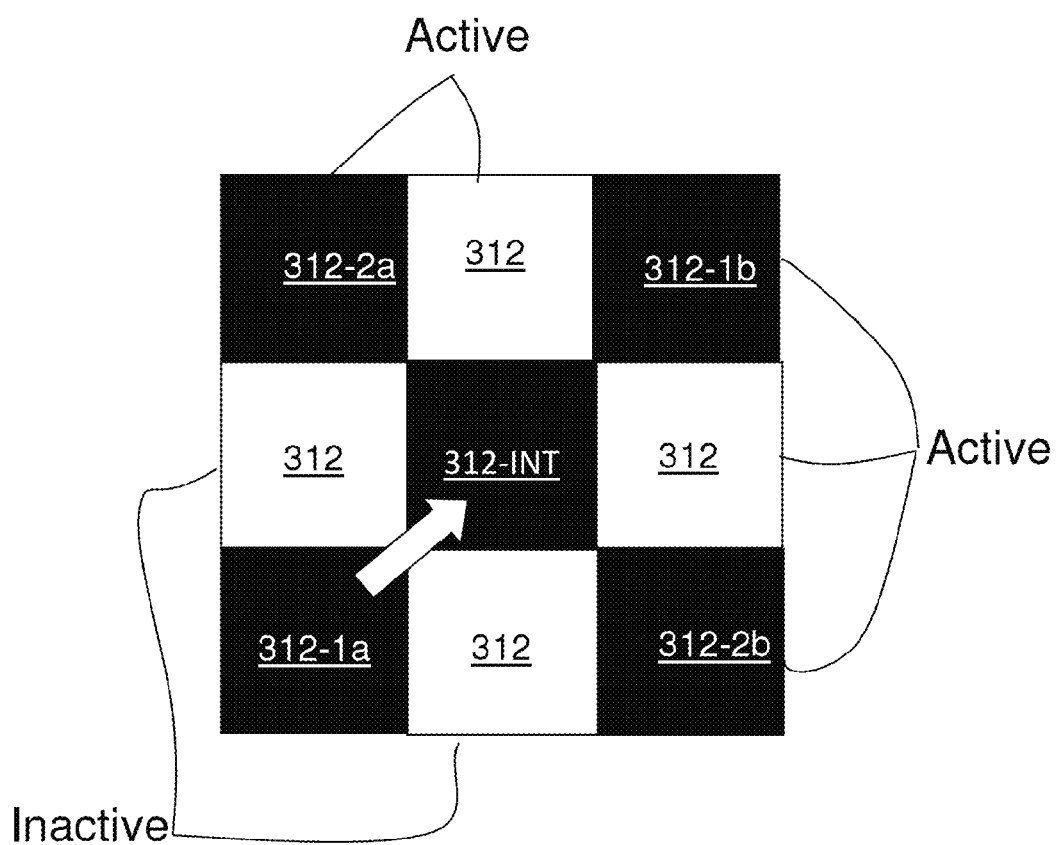

If the current pixel 312 is designated as an intersection, the process follows the same steps, except that after re-centering over the next pixel, the just-recorded pixel is not erased, as it is part of another line. FIG. 10D demonstrates an example intersection, where the line continues through pixels 312-1a, 312-INT and 312-1b. When this line has been recorded, pixel 312-INT will not be erased, as it is also a part of line 330-2. When Line 330-2 is traced, the pixel will be erased, as it will no longer qualify as an intersection without the presence of the already-traced line 330-1

Figure 11:
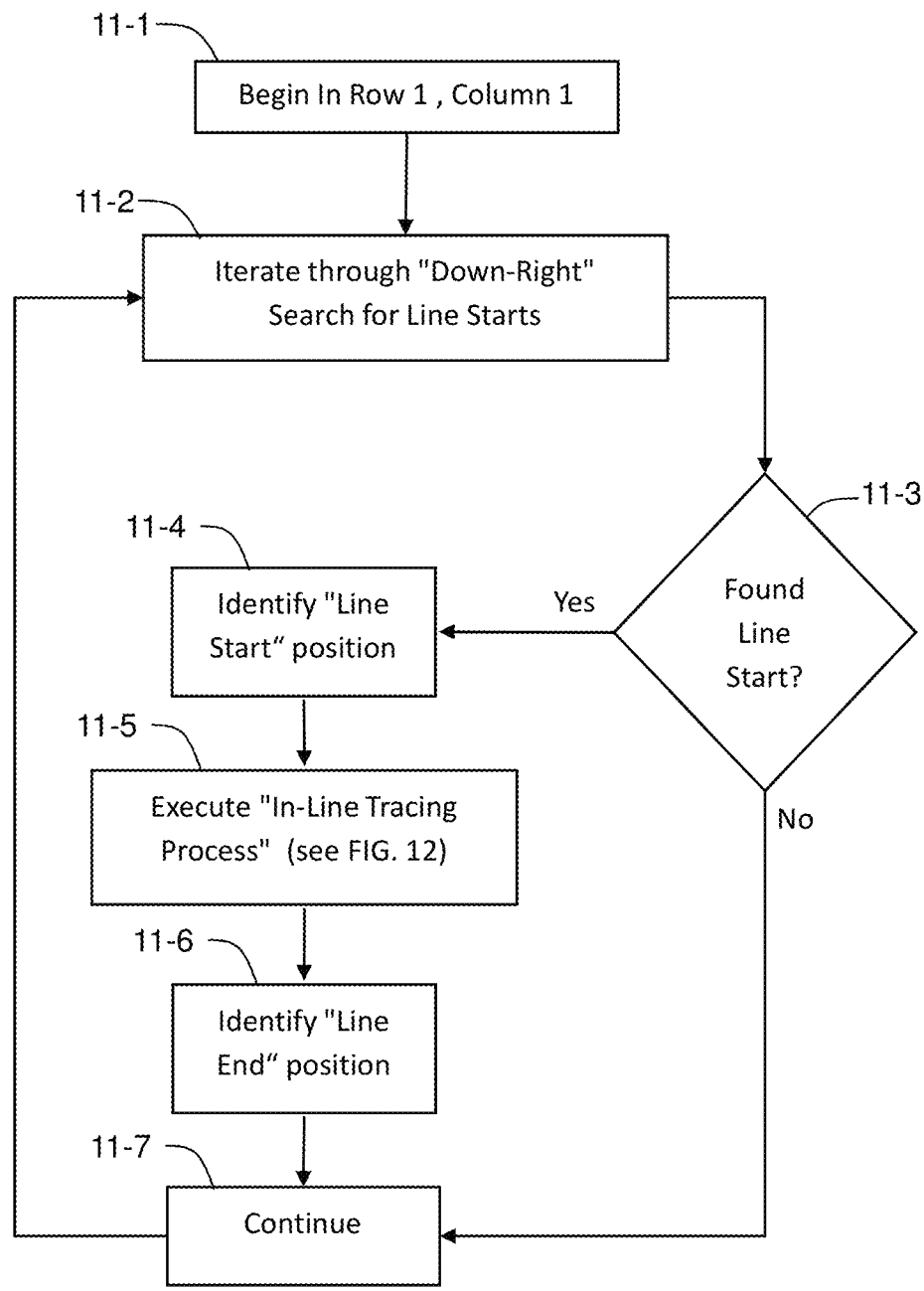
FIG. 11 and FIG. 12 are flow diagrams that illustrate the steps of an example embodiment of the optimal drawing path method of the disclosure.
Figure 12:
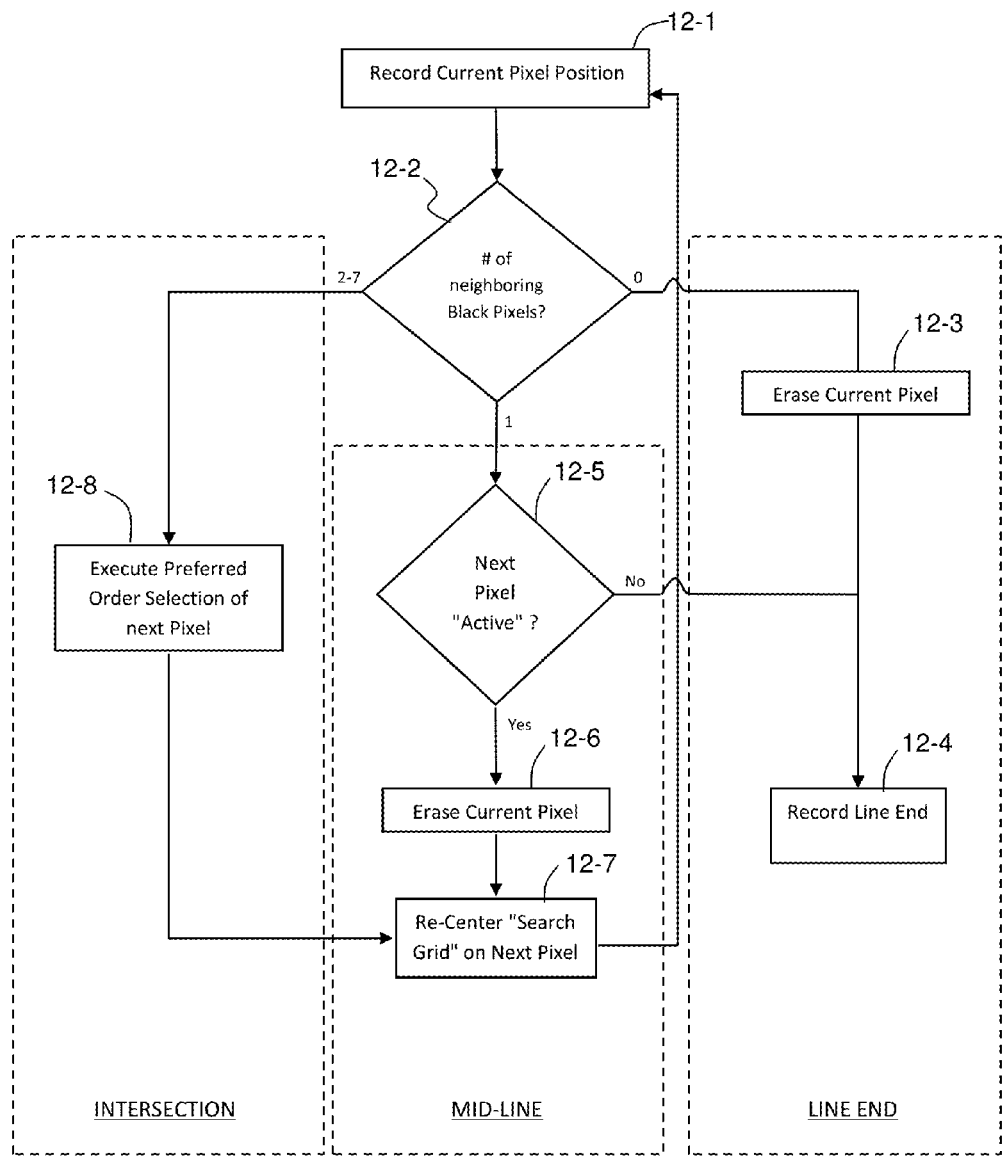

FIG. 11 and FIG. 12 are flow diagrams that illustrate the flow of the above-identified example optimal drawing path method. With reference first to FIG. 11, the method begins with step 11-1 in row 1, column 1. Then in step 11-2, the pixel iteration process, which searches "down" the left-most column and then shifts right by one column, is initiated. In FIG. 11-3, if a line start (e.g., 312L) is found, then in 11-4 the line start position is identified. In 11-5, the in-line tracing process is carried out as described above until the position of the end of the line is found in 11-6. The in-line process is discussed in greater detail in FIG. 12, which is discussed below. The process then continues in step 11-7 and returns to step 11-2 and iterates until completed. Note that if the line start position is not found in 11-3 (i.e., all the pixels are "white"), then the process keeps cycling through the columns by stepping to the right by one column until a "black" image pixel is found.

FIG. 12 is a flow diagram of the in-line tracing process of step 11-5 of FIG. 11. The flow diagram has three sections directed to determining an intersection, mid-line portion, and end of a line 310. This process starts out by recording the position of the current black pixel 312. In step 12-2, the number of neighboring black pixels is determined. There can be anywhere from 0 to 7. If the number is 0, that means the end of a line has been reached. Thus, in step 12-2, the current pixel is erased and the end of the line position recorded in step 12-3.

However, if the number is 1, then the method proceeds to step 12-5, which asks if the next-in-line pixel is active; that is, if the line between the current pixel and the next pixel is within 90° of the current line trajectory. If the answer is no, then the method goes to step 12-4 and records the end of the line. If the answer is yes, then the current pixel is erased from the graphics image 300 in step 12-6 and the search is re-centered on the next-in-line pixel in step 12-7. The method then returns to step 12-1.

In step 12-1, if the number of neighboring pixels is in the range of 2 and 7, then the method executes preferred-order selection on the next-in-line pixel as described above. The process then moves to the re-centering step 12-7 and then returns to initial step 12-1.

Bow Wave Mitigation

Figure 13A:
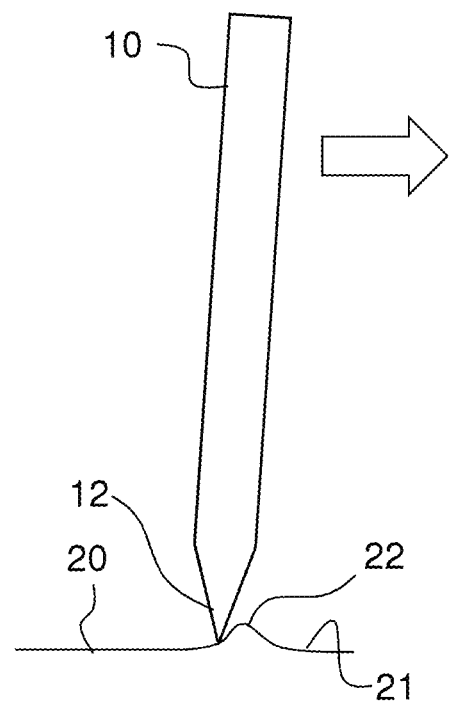
FIG. 13A is a schematic side view of a stylus moving over a tactile drawing medium and forming a bow wave in the tactile drawing medium at its leading edge.

This approach to forming the optimal drawing path has, among others, a physical advantage during the printing of tactile features 32RL. For example, with reference to FIG. 13A, the movement of the tip 12 of stylus 10 over its path while contacting tactile drawing medium 20 can create a bow wave effect, wherein the material that makes up tactile drawing medium 20 collects ahead of the stylus and forms a ripple or bow wave 22.

Bow wave 22 becomes problematic when stylus 10 changes its direction abruptly, such as at a right angle or other sharp angle to its original direction of motion. The presence of bow wave 22 can have the adverse consequence of creating a physical discrepancy between the intended and printed tactile features 30 so that the original drawing 32 is not faithfully reproduced. It is thus advantageous to treat a tactile feature 30 that has a relatively sharp angle as two different tactile features. This causes stylus 10 to retract at the location of the angle (turning point), thereby releasing tactile drawing medium 20 and allowing bow wave 22 to dissipate. Stylus 10 is then lowered and the second tactile feature 30 begins from the angle or turning point; its starting point is a more accurate representation of the original drawing than it would have been without this tactic The bow wave problem also arises when hand-drawing a tactile feature 30 in Tactile drawing medium 20. However, this effect can be minimized by holding stylus 10 at an angle in the direction of movement, much in the same way one might do when drawing with pencil on paper. This bow-wave mitigation technique can be implemented while printing using tactile printer 200 by adding an angled and/or castering feature to tip 12 of stylus 10.

In some instance, tactile drawing medium presents a sufficient resisting force on stylus tip 12 that the tip is substantially deflected relative to the nominal stylus location. Thus, in an example, tactile printer 200 is configured to account for this deflection when printing in tactile drawing medium 20'. In an example, the amount of deflection correction can be determined empirically and added to tactile drawing software, which can update the .RLD file accordingly.

The example embodiments thus far have referred to a single stylus 10. However, example embodiments include using different styluses 10 or 110 whose tips are formed with different materials, in different, widths, shapes, angles, castering dimensions and contact types (rolling vs. sliding) so that tactile features 30 can be controlled and altered. This will result in different line widths, heights and textures. This can be done by equipping the tactile printer with means for selecting different styluses in a manner similar to how certain printers can select ink cartridges or pens. In another example, stylus 10 or 110 is configured to include a rotary turret of several selectable tips so as to allow the printer to switch between the different styluses.

Figure 14:
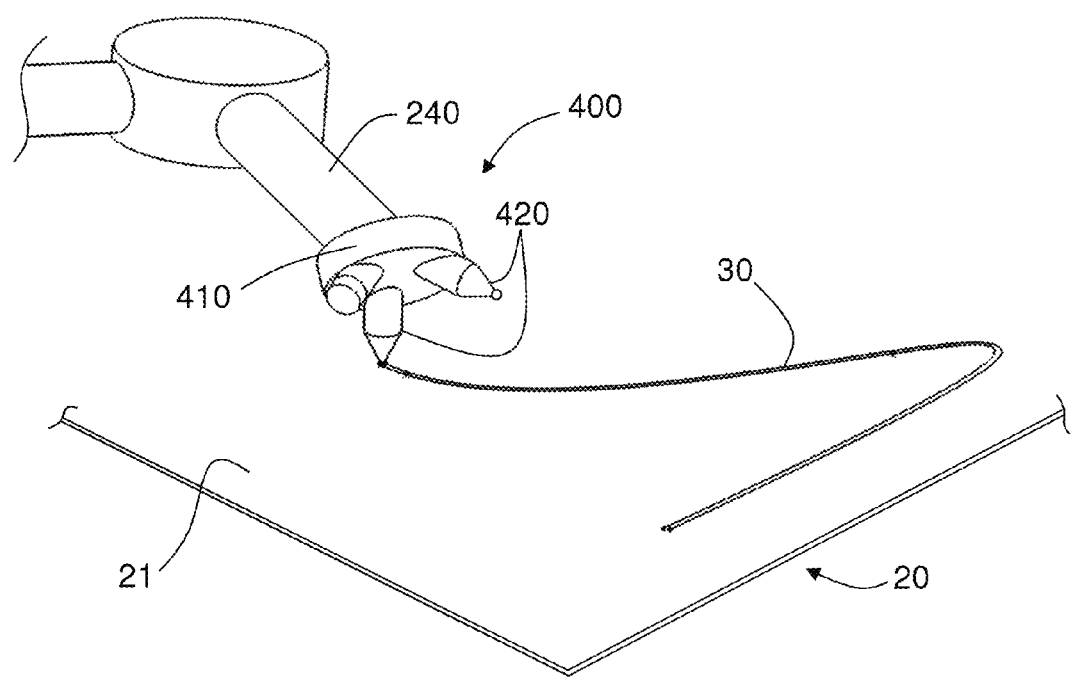
FIG. 14 is a close-up elevated view of the arm of a tactile printer that includes a rotary turret that supports a number of different stylus tips.

FIG. 14 shows an example embodiment that includes a rotary turret 400 for deploying different stylus tips 420. In this example, rotary turret 400 having a turret support member 410 that supports three stylus tips 420. In an example embodiment as shown, rotary turret 400 is mounted to plotter arm 240 of tactile printer 200. By rotating turret support member 410 to set positions, tactile printer can employ different styluses 420 to create tactile features 30. Printer 200 is configured to put stylus tips 410 in contact with surface 21 of tactile drawing medium 20 to create tactile features 30 having, for example, different textures, widths and/or heights.

In another example embodiment, the characteristics of tactile feature 30 can also be changed by varying the amount of downward force applied to stylus tip 12 or 122. Greater the downward force will alter the width, height and texture of tactile feature 30. Varying the downward force thus allows the user to feel different line characteristics for different parts of a drawing.

In this example embodiment, variable downward forces are achieved by using force controlled linear actuator stylus to raise and lower tip 112. This stylus-actuating motor has a predetermined number of compressive forces to make variable-width tactile features. In an example, there could be 5 set-points, creating lines that range from very thin to very thick. In this example, each line would have constant thickness, determined by a value in the .RLD file adjacent to the delimiter that signals the beginning of the line.

Continuing the current example, Tables 3 and 4 below indicate how the position data in the .RLD file translates into an action for tactile printer 200 to create one or more tactile features 30 of variable width on tactile drawing medium 20'. In table 3, "A" and "B" are numerical (scalar) values, while "!" is still a delimiter indicating the beginning or ending of a line, and "C" is a numerical value between 1 and 5 that indicates the line thickness. The value of "C" determines the force of the actuator that lowers the spring-tip assembly, and thus determines the down-force of the tip and the thickness of the line.

TABLE 3

.RLD data and printer action (with variable width lines)

| DATA | PRINTER ACTION |
|---|---|
| (x, y) = (A, B) | Move to Column # A and Row # B |
| (!, C) | If Stylus is UP, then move stylus DOWN to compression level C |
| | If Stylus is DOWN, then move stylus UP |

In another example, the value of "C" in Table 3 could indicate which tip to select from a collection of available tips, e.g. to select a specified line thickness. This tip selection could be executed, by example, with the rotary turret 400 embodiment of FIG. 14.

Figure 13B:
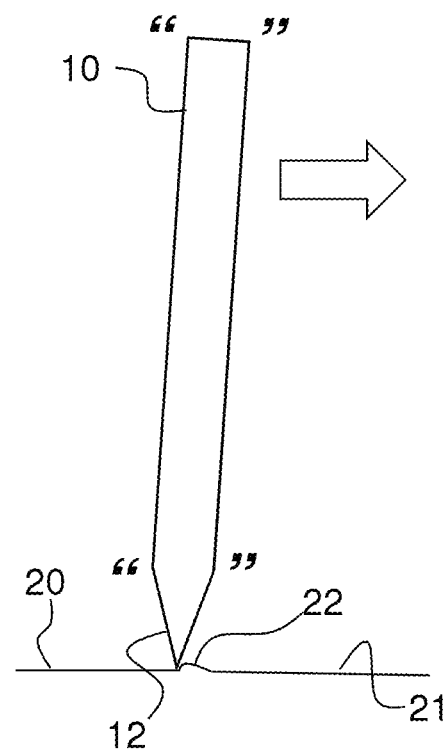
FIG. 13B is similar to FIG. 13A and illustrates an example embodiment wherein the stylus is vibrated to reduce or eliminate the bow wave.

As illustrated in FIG. 13B, in an example embodiment, stylus 10 is vibrated to reduce the effect of bow wave 22. The vibration instructions can be included in the .RLD file. In one example, tactile printer 200 is configured to vibrate stylus 10, while in another embodiment, the stylus actuator is configured to vibrate autonomously.

In an example, timely vibration is achieved by mounting a vibrating motor to the tip or stylus. When the software signals the stylus to go down or engage the tactile medium, the motor is activated until the stylus is signaled to move up or disengage the tactile medium. Thus, the stylus is vibrating any time that tactile features ## are being generated.

Figure 15:
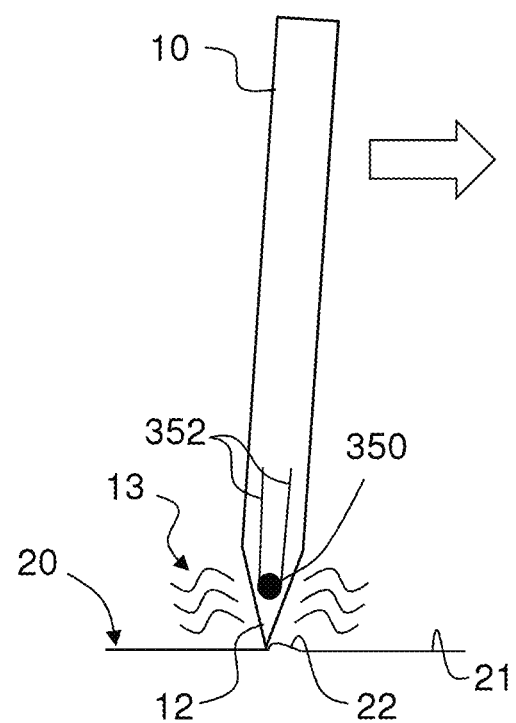
FIG. 15 is similar to FIGS. 13A and 13B and illustrates an example of a stylus having a heated tip to reduce the size of the bow wave formed when forming a tactile drawing feature in a tactile drawing medium.

FIG. 15 illustrates an example stylus 10 (which can be either the hand-held or printer stylus) having a heated stylus tip 12 that produces heat 13. The heat 23 is sufficient to reduce the resisting force of tactile drawing medium 20 on stylus tip 12 (the direction of motion of stylus 10 is shown by the arrow) and thus reduces bow wave 22. In an example, stylus 10 includes an internal resistive heating element 350 that includes electrical leads 352 that are connected to a power supply (not shown). In an example, the amount of heat 13 generated by heating element 350 and regulated by processor 232 in tactile printer 200.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A method for digitizing and reproducing an original tactile feature formed on a first tactile drawing medium, comprising:
    moving a stylus over a path on the first tactile drawing medium to form a tactile feature thereon;
    digitally recording the path of the moving stylus to generate digital path data, wherein digitally recording the path includes detecting the path using a receiver adapted to receive signals either reflected from or transmitted by the stylus; and
    reproducing the original tactile feature on a second tactile drawing medium operably disposed in a tactile printer, based on the original digital path data.

2. The method according to claim 1, wherein the tactile printer includes a printer stylus, and further comprising:
    converting the digitally recorded path data to a positional (x,y) format that includes at least one delimiter symbol that indicates an up or down status of the printer stylus relative to the second tactile drawing medium; and
    providing the converted digitally recorded path data to the tactile printer.

3. The method according to claim 2, further comprising vibrating the printer stylus.

4. The method according to claim 2, further comprising angling the printer stylus relative to a normal to the second tactile drawing medium.

5. The method according to claim 2, further comprising providing the printer stylus with a castered tip.

6. The method according to claim 1, wherein digitally recording the path includes detecting the path using a digitizing tablet.

7. A method for digitizing and reproducing an original tactile feature formed on a first tactile drawing medium, comprising:
- moving a stylus over a path on the first tactile drawing medium to form a tactile feature thereon;
- digitally recording the path of the moving stylus to generate digital path data;
- reproducing the original tactile feature on a second tactile drawing medium operably disposed in a tactile printer that includes a printer stylus having a castered tip, based on the original digital path data;
- converting the digitally recorded path data to a positional (x,y) format that includes at least one delimiter symbol that indicates an up or down status of the printer stylus relative to the second tactile drawing medium; and
- providing the converted digitally recorded path data to the tactile printer.

8. The method according to claim 7, further comprising vibrating the printer stylus.

9. The method according to claim 7, further comprising angling the printer stylus relative to a normal to the second tactile drawing medium.

10. The method according to claim 7, wherein digitally recording the path includes detecting the path using a digitizing tablet.

* * * * *